US 12,166,672 B1

United States Patent
Mahishi et al.

(10) Patent No.: US 12,166,672 B1
(45) Date of Patent: Dec. 10, 2024

(54) APPARATUS, SYSTEM, AND METHOD FOR INSTANT ROUTING ENGINE SWITCHOVERS

(71) Applicant: Juniper Networks, Inc., Sunnyvale, CA (US)

(72) Inventors: Shrish Mahishi, Bangalore (IN); Shrishail Halbhavi, Bangalore (IN); Gopinath Ramasamy, Bangalore (IN); Nitesh Bahadur Sinha, Bangalore (IN); Murali P T, Bengaluru (IN); Sunil Mekad, Bangalore (IN); Kathiresan Kandasamy, Hosur (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/365,804

(22) Filed: Aug. 4, 2023

(51) Int. Cl.
  *G06F 15/173* (2006.01)
  *H04L 45/42* (2022.01)
  *H04L 45/655* (2022.01)

(52) U.S. Cl.
  CPC ........... *H04L 45/42* (2013.01); *H04L 45/655* (2022.05)

(58) Field of Classification Search
  CPC ....... H04L 45/42; H04L 45/655; H04L 45/24; H04L 45/28; H04L 49/55; H04L 49/557
  See application file for complete search history.

(56) References Cited

U.S. PATENT DOCUMENTS

| 7,940,650 | B1 | 5/2011 | Sandhir |
| 9,491,107 | B1 * | 11/2016 | Scudder .................. H04L 45/28 |
| 2005/0163044 | A1 | 7/2005 | Haq |
| 2023/0208747 | A1 | 6/2023 | Harode |

OTHER PUBLICATIONS

Extended European Search Report for European Application No. 23206227.3, dated Apr. 24, 2024; 15 pgs.
USPTO Certificate of Correction for Patent No. US7940650B1; 1 pg.

* cited by examiner

*Primary Examiner* — John B Walsh
(74) *Attorney, Agent, or Firm* — Greenberg Traurig, LLP (57) ABSTRACT

A disclosed computing device capable of instantly switching over between routing engines may include (1) a packet forwarding board configured to (A) forward control traffic via a first link to a traffic replication device and (B) forward data traffic via a second link to a first routing engine, (2) the traffic replication device configured to (A) replicate the control traffic received from the packet forwarding board and (B) select control signals received from the first routing engine, (3) the first routing engine configured to receive control traffic from the traffic replication device, and (4) a second routing engine configured to receive control traffic from the traffic replication device. Various other apparatuses, systems, and methods are also disclosed.

20 Claims, 5 Drawing Sheets

APPARATUS, SYSTEM, AND METHOD FOR INSTANT ROUTING ENGINE SWITCHOVERS

BACKGROUND

Packet routers often include redundant control plane solutions. For example, a router may include a master routing engine and a backup routing engine. The backup routing engine can take over the control plane in the event that a fault occurs in the master routing engine. Unfortunately, the switchover process between routing engines can take many seconds; thereby causing packet losses and protocol timeouts.

The instant disclosure, therefore, identifies and addresses a need for additional and/or improved apparatuses, systems, and methods for achieving faster switchovers between routing engines.

SUMMARY

As will be described in greater detail below, the instant disclosure generally relates to apparatuses, systems, and methods for instantly switching over between routing engines. In one example, a computing device may include (1) a packet forwarding board configured to (A) forward control traffic via a first link to a traffic replication device and (B) forward data traffic via a second link to a first routing engine, (2) the traffic replication device configured to (A) replicate the control traffic received from the packet forwarding board and (B) select control signals received from the first routing engine, (3) the first routing engine configured to receive control traffic from the traffic replication device, and (4) a second routing engine configured to receive control traffic from the traffic replication device.

Similarly, a system for instantly switching over between routing engines may include a computing device that may include (1) a packet forwarding board configured to (A) forward control traffic via a first link to a traffic replication device and (B) forward data traffic via a second link to a first routing engine, (2) the traffic replication device configured to (A) replicate control traffic received from the packet forwarding board and (B) select control signals received from the first routing engine, (3) the first routing engine configured to receive control traffic from the traffic replication device, and (4) a second routing engine configured to receive control traffic from the traffic replication device.

A corresponding method may include (1) replicating control traffic received from a packet forwarding board, (2) transmitting the replicated control traffic to a first routing engine and a second routing engine, (3) selecting control signals from the first routing engine for forwarding, and (4) in response to detecting a fault in association with the first routing engine, selecting control signals from the second routing engine for forwarding.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for switching between routing engines in a packet router with little to no wait-time. As will be described in greater detail below, embodiments of the present disclosure may include and/or involve an intermediate traffic replication device between a packet forwarding board, which is often implemented as an application-specific integrated circuit (ASIC), and both the master and backup routing engines within the packet router. In one or more embodiments, the traffic replication device replicates control traffic and transmits the replicated control traffic to both routing engines. The traffic replication device can further include a selector that filters and transmits control plane signals from only one of the routing engines. In response to a detected fault in the master routing engine, for example, the traffic replication device can switch from transmitting control plane signals from the master routing engine to transmitting control plane signals from the backup routing engine. This switchover process is virtually instantaneous because the traffic replication device circumnavigates data buses and drivers that were previously used for control plane packets in the packet router and instead transmits traffic and signals across dedicated Ethernet connections.

Figure 1:
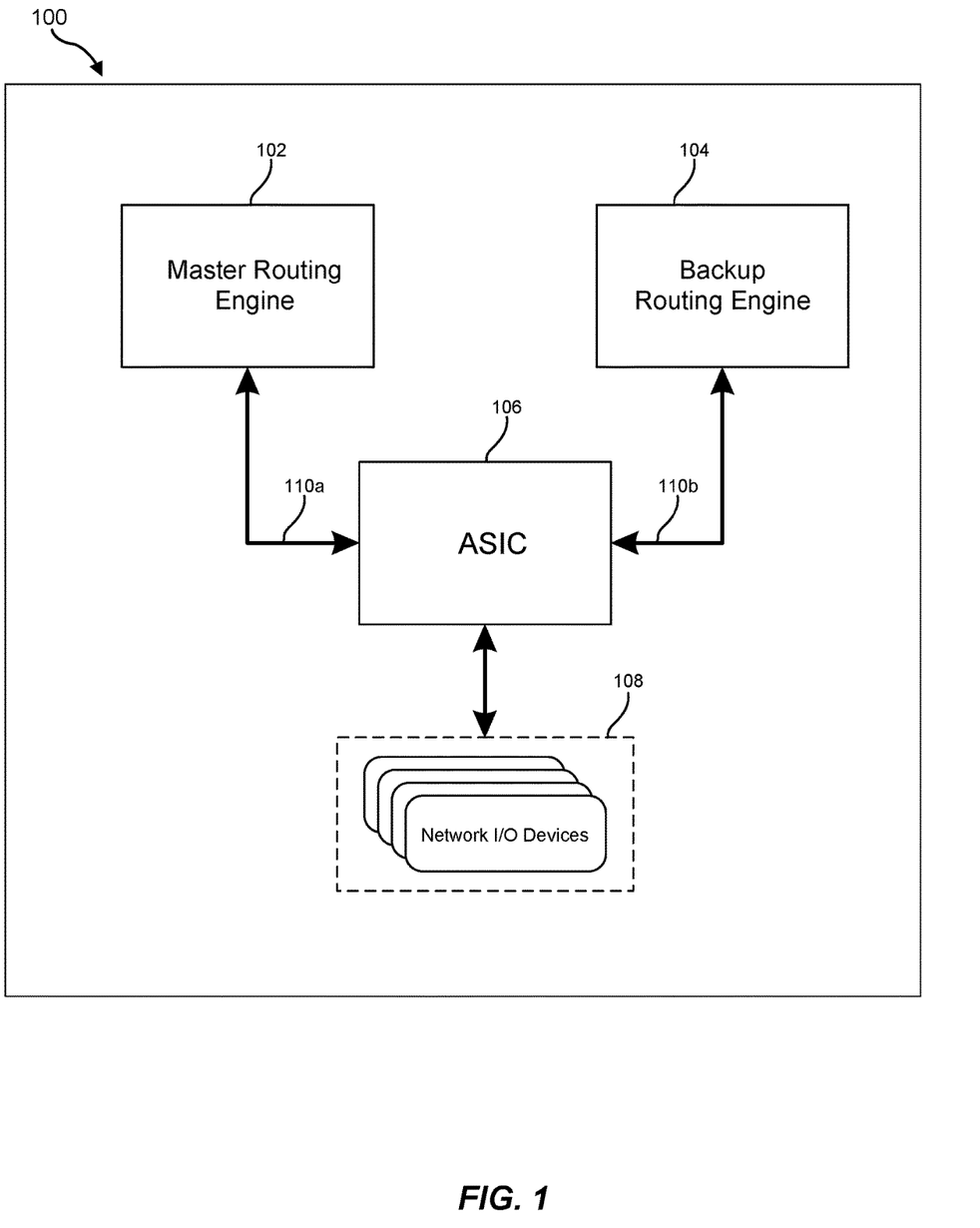
FIG. 1 is an illustration of an existing computing device architecture to illustrate problems that arise during routing engine switchover in accordance with one or more embodiments of this disclosure.

In more detail, as shown in FIG. 1, an existing packet router 100 often includes a forwarding engine board (FEB) or ASIC 106 that is connected to a master routing engine 102 by a peripheral component interconnect express (PCIe) connection 110a that transports packets—including control plane packets—from the ASIC 106. In one or more embodiments, the ASIC 106 receives network traffic including control plane traffic and data traffic from network I/O devices 108 that handle network inputs and outputs. When a fault is detected in the master routing engine 102, the packet router 100 can include a backup routing engine 104 that handles the packet traffic that was previously routed to the master routing engine 102. In many examples, switching over to the backup routing engine 104 from the master routing engine 102 can involve re-enumerating the peripheral component interconnect express (PCIe) connection 110a to a PCIe connection 110b, and loading drivers onto the ASIC 106 to accurately attach the ASIC 106 to the backup routing engine 104. As mentioned above, this process can take tens of seconds. This delay and/or lag may lead to a lengthy control plane outage for the packet router 100.

As such, the traffic replication device described herein can include an Ethernet connection to a packet forwarding board (e.g., an ASIC) in the packet router and additional Ethernet connections to both the master routing engine and the backup routing engine. In some examples, the traffic replication device described herein can include Ethernet connections to the packet forwarding board and routing engines at speeds up to 10G. For example, the packet forwarding board can transmit control plane traffic via the Ethernet connection to the traffic replication device while continuing to transmit data traffic via PCIe connections to the master and backup routing engines.

Moreover, the traffic replication device can include a packet replicator and a signal selector. For example, the traffic replication device can replicate control plane packets received from the packet forwarding board and transmit the replicated packets to both the master routing engine and the backup routing engine. The traffic replication device can further include a selector (e.g., a hitless multiplexer) that can receive control plane signals from both the master routing engine and the backup routing engine. A control board driver can cause the selector to transmit the control plane signals from only one of the routing engines (e.g., the master routing engine). Then, in response to the master routing engine experiencing a fault, the control board driver can cause the selector to transmit the control plane signals from the backup routing engine. As such, the switchover from the master routing engine to the backup routing engine takes the same amount of time it takes for the control board driver to instruct the selector in the traffic replication device (e.g., about 50 microseconds).

Figure 2:
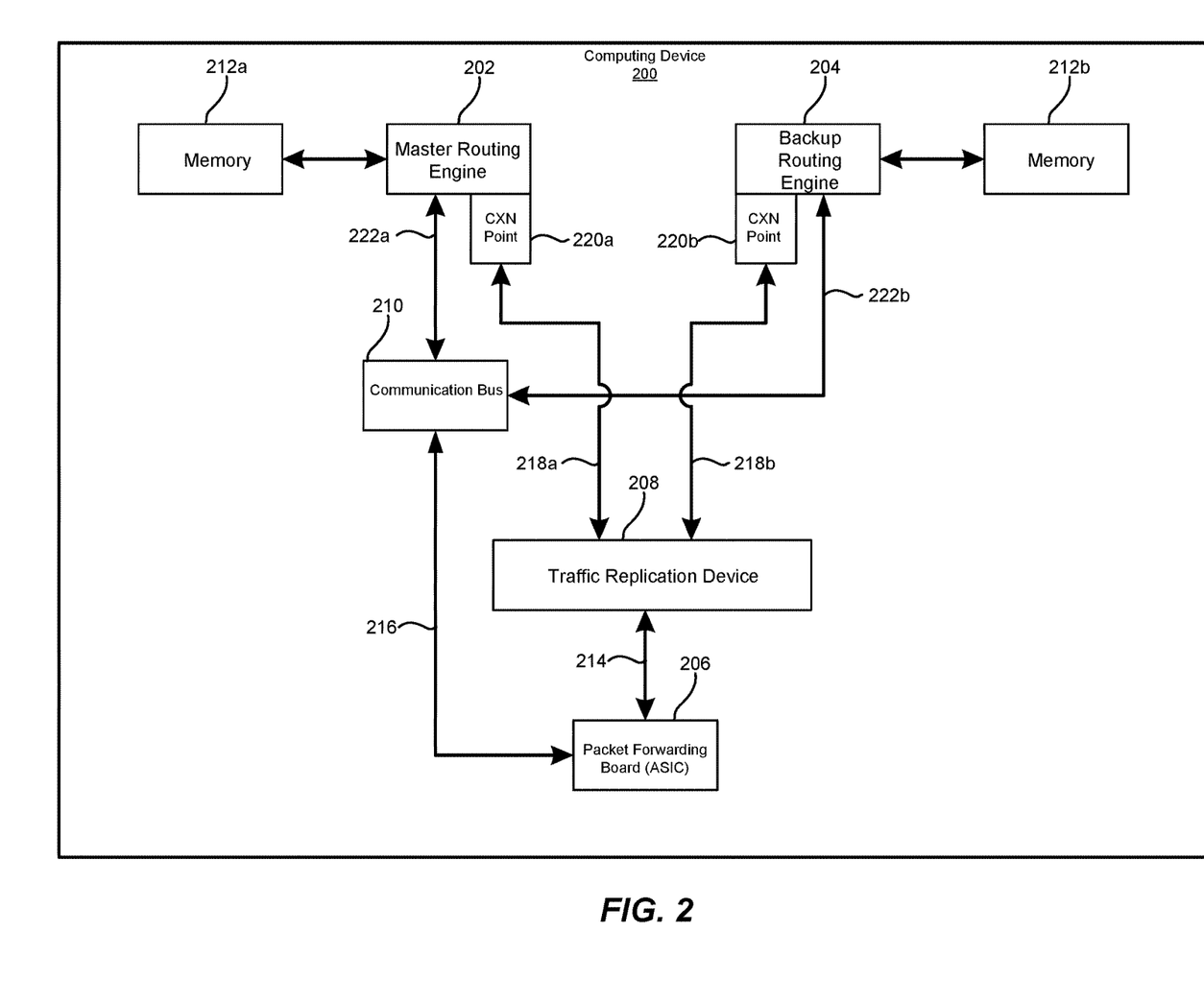
FIG. 2 is an illustration of an exemplary computing device capable of instantly switching over between routing engines in accordance with one or more embodiments of this disclosure.
Figure 3:
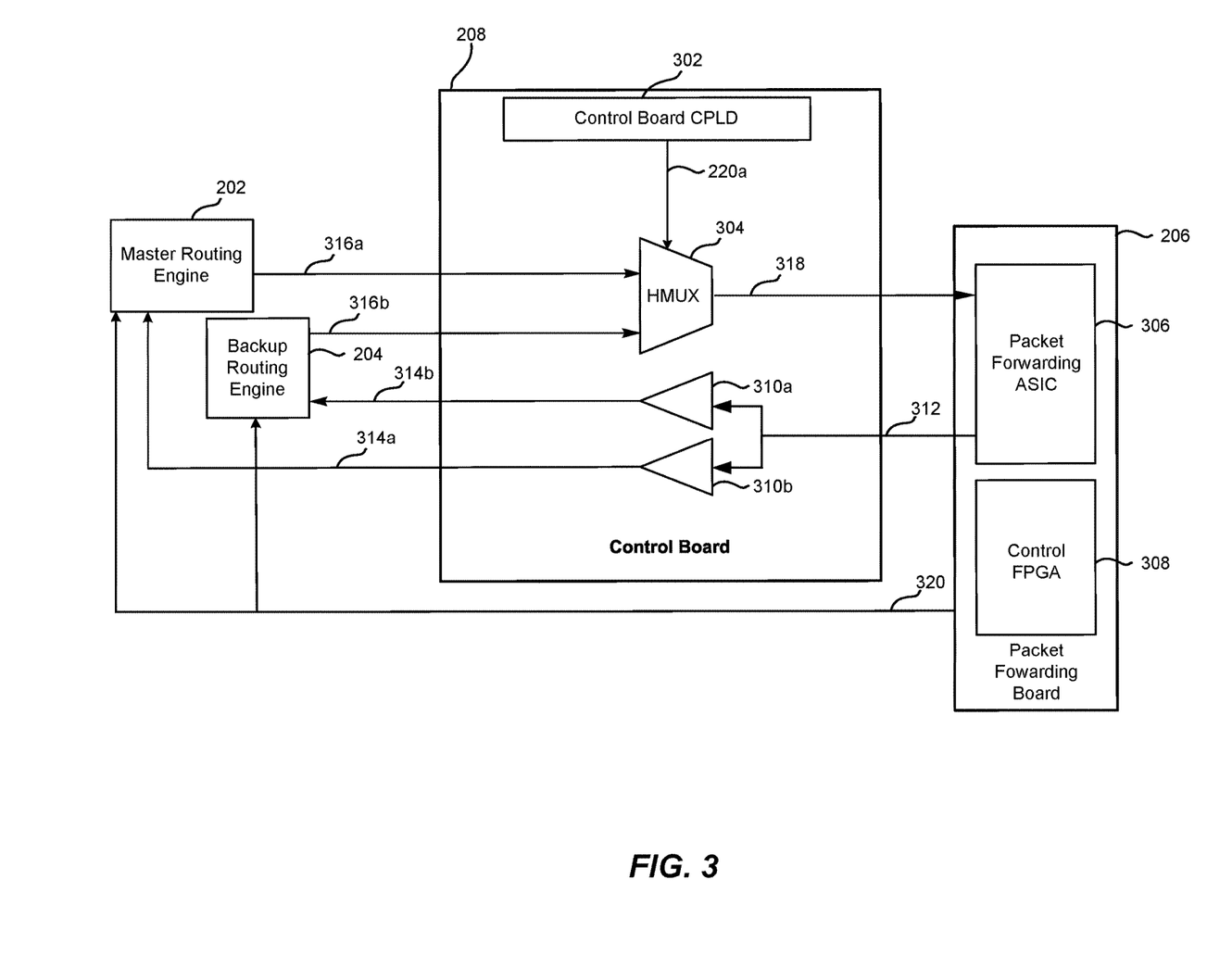
FIG. 3 is a detailed illustration of a traffic replication device that enables instant routing engine switchovers in accordance with one or more embodiments of this disclosure.

While FIG. 1, described above, details the routing engine switchover delays experienced by a typical packet router 100, the following will provide, with reference to FIGS. 2-3, detailed descriptions of exemplary apparatuses, devices, systems, and corresponding implementations for rapidly switching over between routing engines in a packet router. Detailed descriptions of an exemplary method for rapidly switching over between routing engines will be provided in connection with FIG. 4. In addition, detailed descriptions of an exemplary computing system for carrying out such a method will be provided in connection with FIG. 5.

FIG. 2 illustrates at least a portion of an exemplary computing device 200 (e.g., a packet router) capable of switching over from a master routing engine 202 to a backup routing engine 204 with little to no delays. In some examples, the computing device 200 may constitute and/or represent any type or form of physical computing device capable of reading computer-executable instructions, performing computations, transforming data, and/or handling network traffic. Examples of the computing device 200 include, without limitation, network devices, routers (such as provider edge routers, hub routers, spoke routers, autonomous system boundary routers, and/or area border routers), switches, hubs, modems, bridges, repeaters, gateways (such as broadband network gateways), multiplexers, network adapters, network interfaces, client devices, laptops, tablets, desktops, servers, cellular phones, personal digital assistants (PDAs), multimedia players, embedded systems, wearable devices, gaming consoles, variations or combinations of one or more of the same, and/or any other suitable computing devices.

As illustrated in FIG. 1, exemplary computing device 200 may include and/or represent a packet forwarding board 206 (e.g., a PFE board), a traffic replication device 208, a communication bus 210, the master routing engine 202, and the backup routing engine 204. In some embodiments, the exemplary computing device 200 can further include memories 212a, 212b associated with the master routing engine 202 and the backup routing engine 204, respectively. Additionally, the exemplary computing device 200 can include communication points 220a, 220b associated with the master routing engine 202 and the backup routing engine 204, respectively.

In some examples, the packet forwarding board 206 may constitute and/or represent any type or form of physical computing device capable of sending and receiving network traffic. Examples of the packet forwarding board 206 may include one or more line cards that each host one or more network ports capable of sending and receiving network traffic. In some examples, the packet forwarding board 206 may include and/or represent one or more hardware-implemented devices and/or circuits capable of handling, processing, and/or preparing traffic for transmission and/or forwarding. In one example, the packet forwarding board 206 may include and/or represent a packet forwarding engine (PFE) composed of multiple packet processing engines. In this example, the packet forwarding board 206 may parse packets, perform lookup operations, perform filtering operations, classify packets, and/or encapsulate packets. In certain implementations, the packet forwarding board 206 may process packets and/or forward packets between input and output interfaces over various types of communication connections (e.g., PCIe and Ethernet).

In some examples, the packet forwarding board 206 (e.g., an ASIC) may be configured and/or programmed to receive network packets from one or more network I/O devices (e.g., network I/O devices 108 illustrated in FIG. 1) and to forward the received network packets in different ways depending on packet type. For example, the packet forwarding board 206 may forward data traffic including data packets directly to one or more of the master routing engine 202 and the backup routing engine 204. Additionally, the packet forwarding board 206 may forward control traffic including control plane packets to a traffic replication device 208. In one or more embodiments, data packets may include user-requested data such as media segments while control plane packets may include routing instructions specific to the current network topology for how to get the data packets to the user who requested them.

Examples of the packet forwarding board 206 (e.g., an ASIC) may include, without limitation, physical processors, central processing units (CPUs), microprocessors, microcontrollers, field-programmable gate arrays (FPGAs), application-specific integrated circuits (ASICs), systems on chips (SoCs), parallel accelerated processors, tensor cores, integrated circuits, chiplets, portions of one or more of the same, combinations or variations of one or more of the same, and/or any other suitable controller.

As such, the packet forwarding board 206 may be configured and/or programmed to receive network traffic, and separate the network traffic into data traffic and control traffic. In such examples, the network traffic may include and/or represent data packets destined for transmission to a remote device (not necessarily illustrated and/or labelled in FIG. 2). As such, the packet forwarding board 206 can transmit network packets via two or more types of connections. For example, the packet forwarding board 206 can forward data traffic via a PCIe connection (e.g., the link 216) to the communication bus 210. The communication bus 210 can then forward the data traffic to both the master routing engine 202 and the backup routing engine 204 via the links 222a and 222b, respectively. Moreover, in such examples, the packet forwarding board 206 may be connected to the traffic replication device 208 in addition to the communication bus 210.

In some examples, the traffic replication device 208 may be a control board configured and/or programmed to receive and/or obtain control traffic including control plane packets via the link 214 from the packet forwarding board 206. In this example, the traffic replication device 208 may replicate the control traffic received from the packet forwarding board 206. Moreover, in this example, the traffic replication device 208 may transmit and/or communicate the replicated control traffic to one or both of the master routing engine 202 and the backup routing engine 204 according to the communication points 220a and 220b, respectively. As with the link 214, the links 218a, 218b may also be Ethernet connections. Thus, in at least one embodiment, the communication points 220a, 220b can provide Ethernet drivers for the master routing engine 202 and backup routing engine 204 such that the master routing engine 202 and the backup routing engine 204 can receive and transmit signals over the Ethernet links 218a, 218b.

In some examples, the master routing engine 202 and/or the backup routing engine 204 may constitute and/or represent any type or form of physical computing device capable of receiving and transmitting routing information. Furthermore, the master routing engine 202 and/or the backup routing engine 204 may be capable of building and maintaining routing tables, and communicating with other components and interfaces within the computing device 200.

As further shown in FIG. 2, the traffic replication device 208 may receive control signals from one or both of the master routing engine 202 and the backup routing engine 204 via the links 218a, 218b. In one or more embodiments, control signals can include routing instructions generated by the routing engines based on the received control plane packets. In this example, the traffic replication device 208 can receive the control signals at a signal selector such as a hitless multiplexer. In one or more embodiments, the selector can receive a driver signal from a control board driver of the traffic replication device 208 that instructs the selector to forward control signals from one of the master routing engine 202 or the backup routing engine 204. The traffic replication device 208 may then forward the selected control signals back to the packet forwarding board 206 via the link 214.

FIG. 3 illustrates additional detail with regard to the traffic replication device 208. As discussed above, the traffic replication device 208 can receive and replicate control traffic. The traffic replication device 208 can further transmit the replicated control traffic to the master routing engine 202 and the backup routing engine 204. Additionally, the traffic replication device 208 can receive control signals from the master routing engine 202 and/or backup routing engine 204. The traffic replication device 208 can further select one set of control signals to forward. In response to one of the master routing engine 202 or the backup routing engine 204 experiencing a fault, the traffic replication device 208 can switchover to forwarding control signals from the other unaffected routing engine.

In one or more implementations, the traffic replication device 208 can include a control board (e.g., a CB Card). For example, the traffic replication device 208 can be a physical layer device (e.g., a PHY) with the functionality to receive and transmit information over Ethernet connections. The traffic replication device 208 may include components for replicating and selecting data. The traffic replication device 208 may also include components that lets data pass through unaltered.

In more detail, as shown in FIG. 3, the traffic replication device 208 can include control traffic replicators 310a and 310b. In one or more embodiments, the control traffic replicators 310a, 310b can receive control traffic via a link 312 from the packet forwarding board 206. For example, the packet forwarding board 206 (e.g., an ASIC or packet forwarding engine) can include a packet forwarding ASIC 306 and a control field-programmable gate array 308 (control FPGA). In at least one implementation, the packet forwarding ASIC 306 identifies and/or receives control plane packets and forwards the control plane packets via the link 312. In at least one implementation, the control FPGA 308 forwards data traffic including data packets via a link 320. As mentioned above, the link 320 can include a PCIe connection, while the link 312 can include an Ethernet connection.

In one or more embodiments, the control traffic replicators 310a, 310b can replicate the received control traffic. For example, the control traffic replicators 310a and 310b can duplicate each control plane packet in the control traffic such that the master routing engine 202 and the backup routing engine 204 receive identical control plane packets. The control traffic replicators 310a and 310b can further transmit the replicated control traffic to the master routing engine 202 and the backup routing engine 204 via the links 314a and 314b. As with the link 312, the links 314a and 314b can also include Ethernet connections.

After processing the control traffic received from the traffic replication device 208, the traffic replication device 208 can receive control signals from one or both of the master routing engine 202 and the backup routing engine 204. For example, the traffic replication device 208 can include a signal selector 304 that receives control signals from one or both of the master routing engine 202 and the backup routing engine 204 via the links 316a and 316b, respectively. In one or more implementations, the links 316a and 316b are Ethernet links.

Additionally, the signal selector 304 can be hitless multiplexer that selects one set of control signals to forward back to the packet forwarding ASIC 306 via another Ethernet link 318. The signal selector 304 can simultaneously receive control signals via the links 316a, 316b. Additionally or alternatively, the signal selector 304 can receive control signals from only one of the master routing engine 202 or the backup routing engine 204, and does not receive control signals from the other routing engine until a switchover occurs. In one or more embodiments, the traffic replication device 208 further includes a control board driver 302 (e.g., a control board complex programmable logic device, control board CPLD, or CPLD). For example, the control board driver 302 can cause the signal selector 304 to switch from forwarding control signals from the master routing engine 202 to the packet forwarding ASIC 306 to forwarding control signals from the backup routing engine 204, and vice versa. In the example where the signal selector 304 is a hitless multiplexer, the signal selector 304 switch between sets of control signals almost instantaneously.

In at least one embodiment, the control board driver 302 instructs the signal selector 304 to switch over from one set of control signals to the other in response to a detected fault. For example, the master routing engine 202 can experience faults such as, but not limited to, hardware failures, peripheral component interconnect (PCI) bus errors, maintenance that requires the master routing engine 202 to go offline, and storage device errors (such as with the memory 212a). The control board driver 302 can detect and/or be informed of any of these types of faults. Moreover, the control board driver 302 can detect and/or be informed of environmental faults. For example, a component of the exemplary computing device 200 may experience a temperature condition such as overheating. In at least one embodiment, the control board driver 302 can instruct the signal selector 304 to switch over in response to such an environmental issue. In some examples, the control board driver 302 instructs the signal selector 304 to switch over by instructing the signal selector 304 to stop transmission of control signals from the master routing engine 202 and begin forwarding control signals from the backup routing engine 204.

As such, while previous systems required PCIe connection re-enumerations and driver loading to switch between a master routing engine and a backup routing engine, the disclosed apparatus, system, and method enable almost instantaneous switchovers between the master routing engine 202 and the backup routing engine 204. As discussed above, the signal selector 304 can receive control signals from both the master routing engine 202 and the backup routing engine 204, even when the backup routing engine 204 is not functioning as the master. When the master experiences a fault, the control board driver 302 can instruct the signal selector 304 to switch over to transmitting control signals from the backup routing engine 204. This process requires no new enumerations or drivers and can happen in just a few microseconds.

Figure 4:
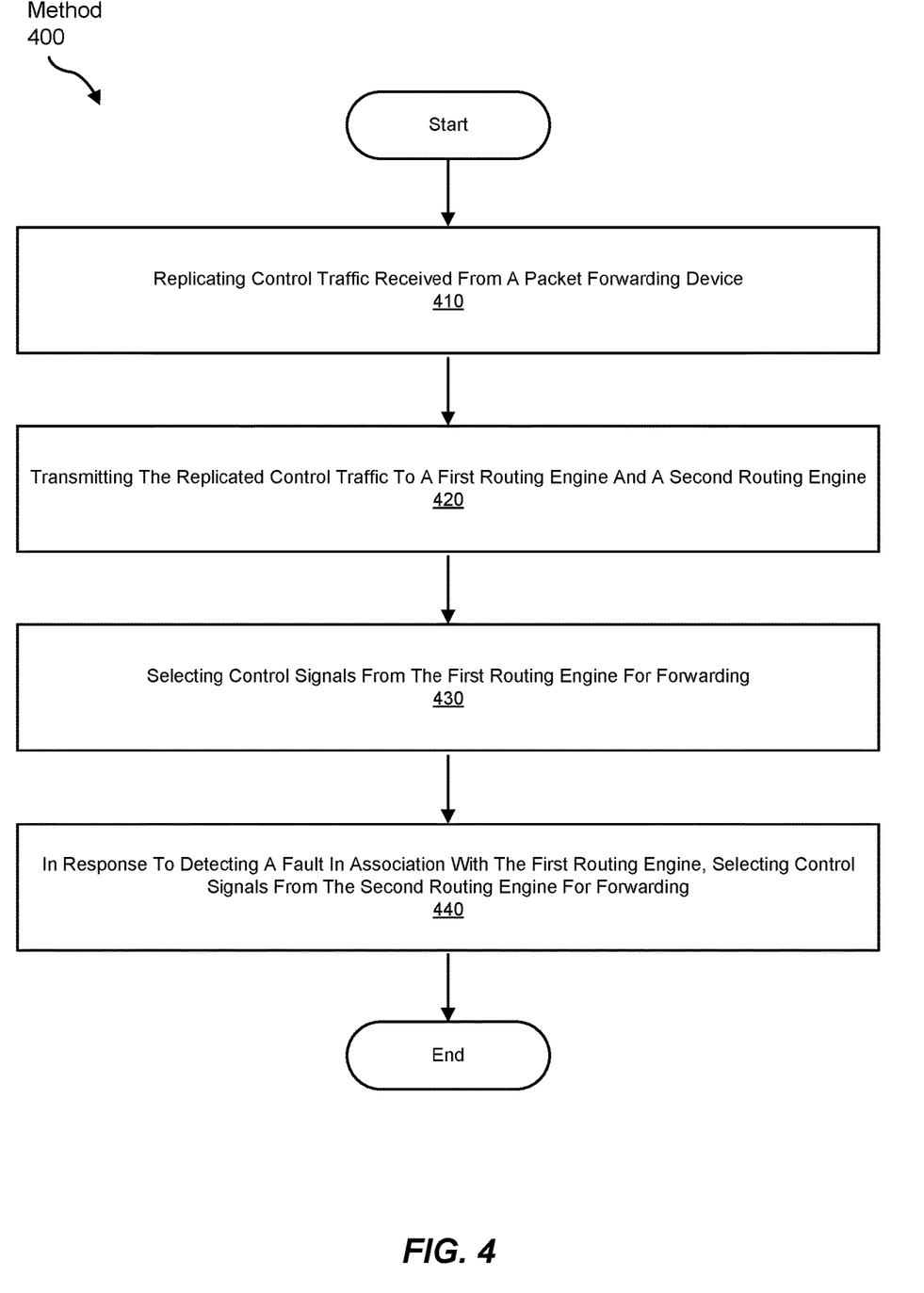
FIG. 4 is a flow diagram of an exemplary method for instantly switching between routing engines in accordance with one or more embodiments of this disclosure.

FIG. 4 is a flow diagram of an exemplary method 400 for instantly switching over from a master routing engine to a backup routing engine, and vice versa. In one example, the steps shown in FIG. 4 may be achieved and/or accomplished by a system, computing device, and/or server for facilitating and/or instant switchovers between routing engines by using an intermediate physical layer device. Additionally or alternatively, the steps shown in FIG. 4 may incorporate and/or involve certain sub-steps and/or variations consistent with the descriptions provided above in connection with FIGS. 2 and 3.

As illustrated in FIG. 4, the method 400 may include a step of replicating control traffic received from a packet forwarding board (410). The step 410 may be performed in a variety of ways, including any of those described above in connection with FIGS. 2 and 3. For example, a traffic replication device (e.g., the traffic replication device 208) may receive control traffic including control plane packets via an Ethernet connection with the packet forwarding board and replicate the control plane packets into two identical groups of control plane packets.

The method 400 may also include a step of transmitting the replicated control traffic to a first routing engine and a second routing engine (420). The step 420 may be performed in a variety of ways, including any of those described above in connection with FIGS. 2 and 3. For example, the traffic replication device may transmit the replicated control traffic to the first routing engine (e.g., the master routing engine 202) and the second routing engine (e.g., the backup routing engine 204) via additional Ethernet connections.

Additionally, the method 400 may include a step of selecting control signals from the first routing engine for forwarding (430). The step 430 may be performed in a variety of ways, including any of those described above in connection with FIGS. 2 and 3. For example, the traffic replication device may include a control signal selector that receives control signals from both the first routing engine and the second routing engine, but forwards only the control signals from one of the first routing engine or the second routing engine.

Moreover, the method 400 may include a step of, in response to detecting a fault in association with the first routing engine, selecting control signals from the second routing engine for forwarding (440). The step 440 may be performed in a variety of ways, including any of those described above in connection with FIGS. 2 and 3. For example, a control board driver of the traffic replication device may detect a fault in the first routing engine and switch the control signal selector to forward control signals from the second routing engine.

Figure 5:
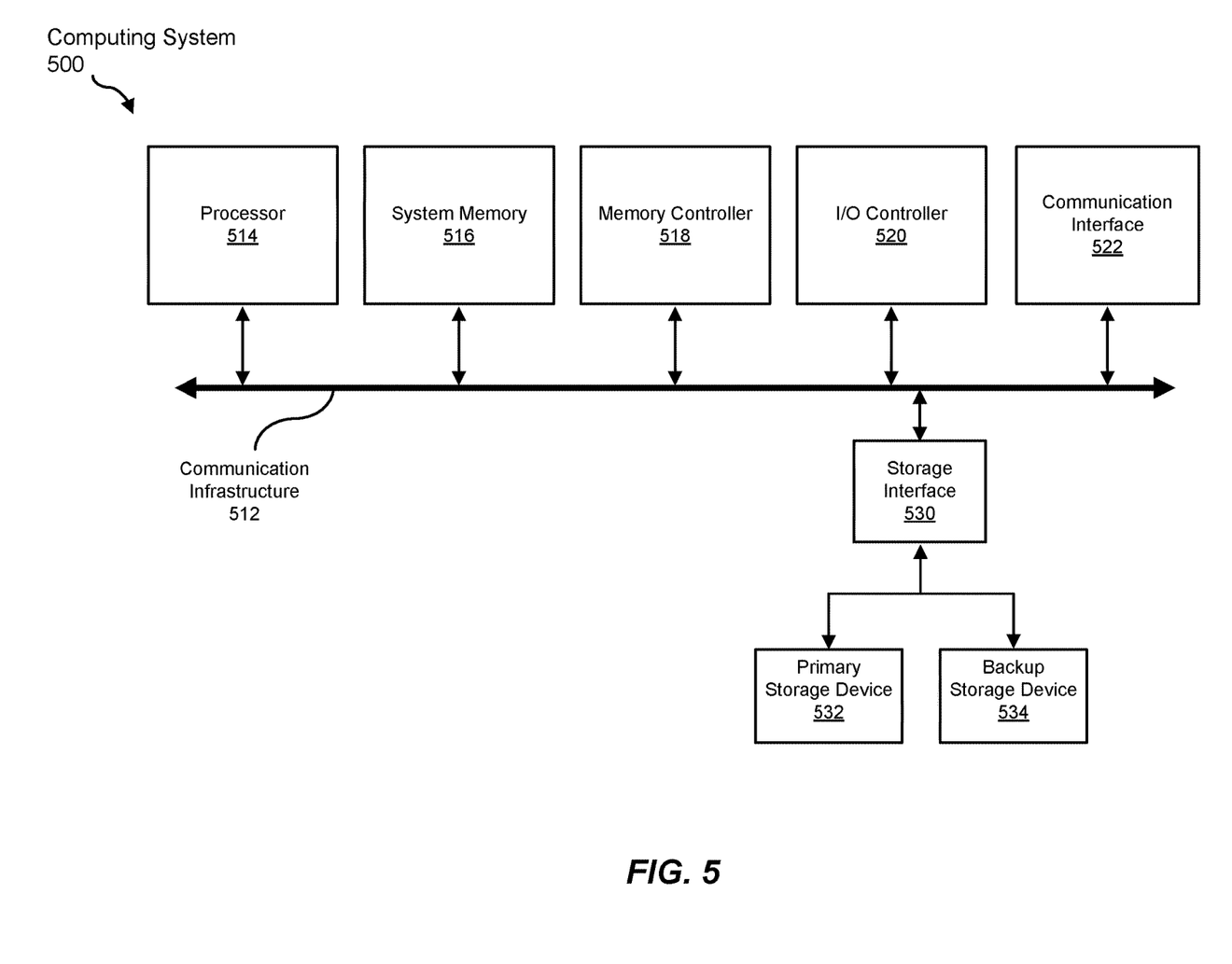
FIG. 5 is a block diagram of an exemplary computing system capable of implementing and/or being used in connection with one or more of the embodiments described and/or illustrated herein.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 4. All or a portion of computing system 500 may also perform and/or be a means for performing and/or implementing any other steps, methods, or processes described and/or illustrated herein.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPOE), a Point-to-Point Protocol over ATM (PPPOA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. For example, processor 514 may represent an application-specific integrated circuit (ASIC), a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device. For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing. For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of the packet router 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules described herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device comprising:
    a packet forwarding board configured to:
        forward control traffic via a first link to a traffic replication device, and
        forward data traffic via a second link to a first routing engine;
    the traffic replication device configured to:
        replicate the control traffic received from the packet forwarding board, and
        select control signals received from the first routing engine;
    the first routing engine configured to receive control traffic from the traffic replication device; and
    a second routing engine configured to receive control traffic from the traffic replication device.

2. The computing device of claim 1, wherein the first routing engine and the second routing engine are configured to receive control traffic from the traffic replication device via Ethernet connections.

3. The computing device of claim 1, wherein:
    the first link comprises an Ethernet connection to the traffic replication device; and
    the second link comprises a PCIe connection to the first routing engine.

4. The computing device of claim 3, wherein the packet forwarding board is further configured to forward the data traffic to the second routing engine via an additional PCIe connection.

5. The computing device of claim 1, wherein the traffic replication device is further configured to simultaneously receive control signals from the first routing engine and the second routing engine.

6. The computing device of claim 5, wherein the traffic replication device is configured to simultaneously receive control signals from the first routing engine and the second routing engine via Ethernet connections.

7. The computing device of claim 1, wherein the traffic replication device further comprises a control board driver that causes the traffic replication device to select control signals received from the second routing engine in response to detecting a fault in the first routing engine.

8. A system comprising:
a computing device comprising:
a packet forwarding board configured to:
forward control traffic via a first link to a traffic replication device, and
forward data traffic via a second link to a first routing engine;
the traffic replication device configured to:
replicate control traffic received from the packet forwarding board, and
select control signals received from the first routing engine;
the first routing engine configured to receive control traffic from the traffic replication device; and
a second routing engine configured to receive control traffic from the traffic replication device.

9. The system of claim 8, wherein the first routing engine and the second routing engine are configured to receive control traffic from the traffic replication device via Ethernet connections.

10. The system of claim 8, wherein:
the first link comprises an Ethernet connection to the traffic replication device; and
the second link comprises a PCIe connection to the first routing engine.

11. The system of claim 10, wherein the packet forwarding board is further configured to forward the data traffic to the second routing engine via an additional PCIe connection.

12. The system of claim 8, wherein the traffic replication device is further configured to simultaneously receive control signals from the first routing engine and the second routing engine.

13. The system of claim 12, wherein the traffic replication device is configured to simultaneously receive control signals from the first routing engine and the second routing engine via Ethernet connections.

14. The system of claim 8, wherein the traffic replication device further comprises a control board driver that causes the traffic replication device to select control signals received from the second routing engine in response to detecting a fault in the first routing engine.

15. A method comprising:
replicating control traffic received from a packet forwarding board;
transmitting the replicated control traffic to a first routing engine and a second routing engine;
selecting control signals from the first routing engine for forwarding; and
in response to detecting a fault in association with the first routing engine, selecting control signals from the second routing engine for forwarding.

16. The method of claim 15, further comprising receiving control traffic from the packet forwarding board via an Ethernet connection.

17. The method of claim 16, further comprising transmitting the replicated control traffic to the first routing engine and the second routing engine via Ethernet connections.

18. The method of claim 15, further comprising forwarding the control signals from the first routing engine to one or more network input/output controllers.

19. The method of claim 15, further comprising, in response to selecting the control signals from the second routing engine for forwarding:
stopping transmission of the control signals received from the first routing engine; and
forwarding the control signals from the second routing engine to the packet forwarding board.

20. The method of claim 15, wherein selecting the control signals from the second routing engine is in response to receiving a driver signal that instructs a multiplexer to select the control signals from the second routing engine.

* * * * *